United States Patent [19]

Dettling

[11] Patent Number: 5,212,142
[45] Date of Patent: May 18, 1993

[54] HIGH PERFORMANCE THERMALLY STABLE CATALYST

[75] Inventor: Joseph C. Dettling, Howell, N.J.

[73] Assignee: Engelhard Corporation, Iselin, N.J.

[21] Appl. No.: 787,192

[22] Filed: Nov. 4, 1991

[51] Int. Cl.$^5$ .................. B01J 21/04; B01J 21/06; B01J 23/10; B01J 23/40; B01J 23/89
[52] U.S. Cl. .................... 502/304; 502/302; 423/213.5
[58] Field of Search .............. 502/304, 302, 303; 423/213.5

[56] References Cited

U.S. PATENT DOCUMENTS

| | | | |
|---|---|---|---|
| 4,062,810 | 12/1977 | Vogt | 252/462 |
| 4,082,837 | 4/1978 | Whelan | 423/405 |
| 4,153,579 | 5/1979 | Summers et al. | 502/304 |
| 4,233,189 | 11/1980 | Gandhi | 252/472 |
| 4,261,862 | 4/1981 | Kinoshita | 252/462 |
| 4,283,308 | 8/1981 | Ohara | 252/435 |
| 4,289,737 | 9/1981 | Acres | 423/245 |
| 4,294,726 | 10/1981 | Bozon | 252/462 |
| 4,299,734 | 11/1981 | Fujitani | 252/462 |
| 4,492,769 | 1/1985 | Blanchard | 502/262 |
| 4,587,231 | 5/1986 | Sawamura | 502/304 |
| 4,675,308 | 6/1987 | Wan | 502/304 |
| 4,714,694 | 12/1987 | Wan | 502/304 |
| 4,806,519 | 2/1989 | Chiba | 502/252 |
| 4,851,293 | 7/1989 | Egerton | 428/403 |
| 4,857,296 | 8/1989 | Brunelle | 423/574 R |
| 4,868,148 | 9/1989 | Henk | 502/303 |
| 4,965,243 | 10/1990 | Yamada | 502/304 |
| 4,992,405 | 2/1991 | Chattha | 502/303 |
| 5,057,483 | 10/1991 | Wan | 502/304 |
| 5,063,192 | 11/1991 | Murakami et al. | 502/304 X |

FOREIGN PATENT DOCUMENTS

| | | |
|---|---|---|
| 262962 | 4/1988 | European Pat. Off. . |
| 337809 | 10/1989 | European Pat. Off. . |
| 0145380 | 11/1975 | Japan . |
| 1157346 | 7/1986 | Japan . |
| 2106826 | 5/1987 | Japan . |
| 3007845 | 1/1988 | Japan . |
| 3020028 | 1/1988 | Japan . |
| 3077544 | 4/1988 | Japan . |
| 3134058 | 6/1988 | Japan . |
| 3205141 | 8/1988 | Japan . |
| 1070146 | 3/1989 | Japan . |
| 1123636 | 5/1989 | Japan . |
| 2204030 | 11/1988 | United Kingdom . |

OTHER PUBLICATIONS

Luccini, et al., "Preparation of Zirconia–Ceria Powders . . ." Int. J. of Mat. & Prod. Tech., vol. 4, No. 2 1989, pp. 167–175.

Primary Examiner—W. J. Shine

[57] ABSTRACT

A catalyst composition includes a carrier on which is disposed a catalytic material which may optionally be provided in discrete first and second coats. The catalyst material contains, e.g., in the first coat, a refractory inorganic oxide first support having a catalytically effective amount of platinum dispersed thereon. The catalyst material also contains, e.g., in the second coat, a stabilized alumina second support having a catalytically effective amount of a second platinum catalyst dispersed thereon, and a third catalyst component which contains a zirconia-stabilized third support, e.g., alumina, having dispersed thereon catalytically effective amounts of rhodium and palladium. A method of treating internal combustion engine exhaust gases with the catalyst composition is also disclosed.

17 Claims, No Drawings

HIGH PERFORMANCE THERMALLY STABLE CATALYST

BACKGROUND OF THE INVENTION

1. Field Of The Invention

The present invention is concerned with catalysts useful for the treatment of gases to reduce contaminants contained therein. More specifically, the present invention is concerned with improved catalysts which may function as catalysts of the type generally referred to as "three-way conversion" or "TWC" catalysts Whereas oxidation catalysts have the capability of catalyzing reactions such as the oxidation of hydrocarbons and carbon monoxide, TWC catalysts are polyfunctional in that they have the capability of substantially simultaneously catalyzing both oxidation and reduction reactions, such as the oxidation of hydrocarbons and carbon monoxide and the reduction of nitrogen oxides Such catalysts find utility primarily in the treatment of the exhaust gases from internal combustion engines, such as automobile and other gasoline-fueled engines.

2. Background and Related Art

In order to meet emissions standards for unburned hydrocarbons, carbon monoxide and nitrogen oxide contaminants in vehicle and other engine exhaust gases, catalytic converters containing oxidation catalysts, or oxidation and reduction catalysts, or a TWC catalyst, are emplaced in the exhaust gas line of internal combustion engines to catalytically promote the oxidation of unburned hydrocarbons ("HC") and carbon monoxide ("CO") and the reduction of nitrogen oxides ("$NO_x$") in the exhaust gas. TWC catalysts usually require that the ratio of air to fuel ("A/F ratio") introduced into the engine whose exhaust gas is being treated be at or within a narrow deviation from the stoichiometric A/F ratio in order to achieve good efficiencies of conversion of HC, CO and NOx pollutants to innocuous substances, that is, to carbon dioxide, water and nitrogen.

Known TWC catalysts which exhibit good activity and long life comprise one or more platinum group metals (e.g., platinum or palladium, preferably including one or more of rhodium, ruthenium and iridium, especially rhodium) distended upon a high surface area, refractory oxide support, e.g., a high surface area alumina coating. The support is carried on a suitable carrier such as a monolithic carrier comprising a refractory ceramic or metal honeycomb structure, or refractory particles such as spheres or short, extruded segments of a suitable refractory material.

The high surface area alumina materials, loosely referred to in the art as "gamma alumina" or "activated alumina", typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or, most usually, rare earth metal oxides, for example, ceria, lanthana and mixtures of two or more rare earth metal oxides For example, see C. D. Keith et al U.S. Pat. No. 4,171,288.

One of the problems faced by present-day catalysts is the high operating temperatures engendered by smaller automotive engines and high speed highway driving. Not only alumina support materials, but other support materials and certain promoter components are especially susceptible to thermal degradation at such high temperatures. Thermal degradation adversely affects the stability of the catalyst and effectiveness of the precious metals used therein. In addition, attempts to improve fuel economy by using A/F ratios higher than stoichiometric, and/or fuel shut-off features, generate a lean (oxygen-rich) exhaust. High exhaust gas temperatures and lean gas conditions accelerate the deterioration of platinum and rhodium catalysts, inasmuch as platinum is more readily sintered, and rhodium more strongly interacts with support materials such as alumina, at such conditions.

For these and other reasons, it is known to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that advantage tends to be offset by a greater durability of the resulting catalyst.

It is also conventional wisdom in the art not to disperse rhodium on a rare earth oxide support such as ceria because of the tendency of rhodium to react with the ceria in a manner which diminishes or reduces the catalytic effectiveness of the expensive rhodium. This is especially true for a catalyst intended for use in lean, high-temperature applications, such as those encountered with the relatively high A/F ratios often employed to increase fuel mileage and reduce HC and CO pollution because such conditions promote the undesired rhodium-ceria reaction. In this regard, see U.S. Pat. No. 4,678,770 of C. Z. Wan et al.

It is known that bulk cerium oxide (ceria) provides an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. For example, see U.S. Pat. No. 4,714,694 of C. Z. Wan et al, which discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

Japanese Patent J6 3205-141-A discloses a layered automotive catalyst in which the bottom layer comprises platinum or platinum and rhodium dispersed on an alumina support containing rare earth oxides, and a top coat which comprises Pd and Rh dispersed on a support comprising alumina, zirconia and rare earth oxides.

Japanese Patent J6 3077-544-A discloses a layered automotive catalyst having a first layer comprising Pd dispersed on a support comprising alumina, lanthana and other rare earth oxides and a second coat comprising rhodium dispersed on a support comprising alumina, zirconia, lanthana and rare earth oxides.

Japanese Patent J6 3007-845-A discloses an exhaust gas catalyst comprising two catalytic components, one comprising platinum dispersed on a refractory inorganic oxide support and a second comprising Pd and Rh dispersed on a refractory inorganic oxide support.

Japanese Patent J6 1157-346-A discloses an automotive catalyst comprising YtO and platinum group metals dispersed on an alumina-zirconia washcoat.

European Patent Application Number 89303729.1, published Oct. 18, 1989 discloses an exhaust purifying catalyst comprising rhodium and palladium dispersed on a support comprising an alumina and iron oxide, each impregnated with ceria (see Example 13, page 9, lines 60–65).

CO-PENDING AND COMMONLY-ASSIGNED PATENT APPLICATION

Patent application Ser. No. 07/341,606, filed Apr. 19, 1989, now abandoned, in the name of Joseph C. Dettling and Yiu-Kwan Lui for "Palladium-Containing, Ceria-Supported Platinum Catalyst and Catalyst Assembly Using the Same" discloses a TWC catalyst containing platinum dispersed on a bulk ceria support which is optionally stabilized with one or both of lanthana and zirconia, and further containing palladium and a binder which may be alumina The palladium may be dispersed on the ceria support and the platinum and palladium may be present in a weight ratio of from about 50:1 to 1:50, calculated as the metals. This co-pending and commonly-assigned application discusses the belief that the palladium, being more readily reduced from the Pd-CeOx pseudo-oxide than is the corresponding Pt-CeOx pseudo oxide, triggers or facilitates reduction of catalytically inactive Pt-CeOx to the catalytically active Pt metal.

SUMMARY OF THE INVENTION

Generally, the present invention provides a three-way conversion catalyst which is particularly resistant to high temperature, lean operating conditions and includes the deposition of both palladium and rhodium catalytic metals dispersed on a ceria-containing support, such as a co-formed ceria-zirconia material. The ceria-containing support is preferably a non-alumina support, i.e., the support does not contain or comprise alumina The catalyst composition also includes platinum dispersed on an alumina support containing a ceria/zirconia/calcia stabilizer-promoter.

Specifically, in accordance with the present invention there is provided a catalyst composition comprising a carrier on which is disposed a catalytic material comprising the following components: (a) a first support comprising stabilized alumina, (b) a catalytically effective amount of a first platinum catalytic component dispersed on the first support, (c) a second support, which may be a non-alumina support, comprising a rare earth metal oxide optionally stabilized with zirconia (e.g., ceria or a co-formed rare earth metal oxide-zirconia support such as a co-formed ceria-zirconia support), and (d) a catalytically effective amount of both a rhodium catalytic component and a palladium catalytic component dispersed on the second support The rhodium and palladium catalytic components are present in quantities to provide in the catalytic material a rhodium to palladium weight ratio of from about 50:1 to 1:50, preferably from about 25:1 to 1:25.

In accordance with one aspect of the present invention, the catalyst composition may further comprise (e) a third support comprising stabilized alumina (which optionally is stabilized with one or both of zirconia and baria), and (f) a catalytically effective amount of a second platinum catalytic component dispersed on the third support.

Another aspect of the present invention provides that the first support may further comprise bulk nickel oxide and bulk ceria. The bulk ceria may have a BET surface area of not greater than about 100 m²g.

Yet another aspect of the present invention provides that components (a) and (b) of the catalytic material are contained in a first, bottom coat disposed on the carrier and components (c), (d), (e) and (f) of the catalytic material are contained in a second, top coat overlying the bottom coat.

Still another aspect of the present invention provides that the first support further comprises a second, co-formed rare earth metal oxide-zirconia material, e.g., a co-formed ceria-zirconia material. The co-formed ceria-zirconia support may comprise from about 5–30 weight percent ceria, and from about 95–70 weight percent zirconia. Another aspect of the invention provides that the second co-formed rare earth metal oxide-zirconia material may be stabilized with calcium oxide.

A method aspect of the present invention provides a method for treating a gas containing noxious components comprising one or more of carbon monoxide, hydrocarbons and nitrogen oxides, by converting at least some of each of the noxious components initially present to innocuous substances such as water, carbon dioxide and nitrogen. The method comprises the step of contacting the gas under conversion conditions (e.g., a temperature of about 100° to 950° C. of the inlet gas to the catalyst composition) with a catalyst composition as described above.

DETAILED DESCRIPTION OF THE INVENTION AND PREFERRED EMBODIMENTS THEREOF

As indicated above, the dispersal of non-rhodium platinum group metals on ceria is known. Such dispersal has been found to be advantageous in providing a more active catalyst; the increased activity is believed to be due to the fact that the platinum dispersed on a ceria support is dispersed in smaller, finer crystallites than when the platinum is dispersed on an alumina support. The same is believed to hold true for rhodium which provides a significantly more active catalyst when dispersed on a bulk ceria support than when dispersed on an activated alumina support. However, as noted above, conventional wisdom in the art holds that, especially when subjected to high temperature and oxidizing (lean exhaust) conditions, rhodium reacts with ceria adversely, resulting in a diminution or loss of the catalytic activity of the rhodium. This reaction is believed to be due to formation of a cerium rhodate complex as discussed below.

The dispersal of a rhodium catalytic component on a bulk rare earth metal oxide has been found to provide a much more active catalyst than the dispersion of rhodium on activated alumina; the increased activity is believed to be due to the interaction of the rhodium metal with the rare earth metal oxide support, which maintains the rhodium dispersed on the support in the form of very small crystallites, which are smaller than the rhodium crystallites which result from dispersing rhodium on activated alumina.

In many catalytic applications, including use of the catalyst as an oxidation catalyst or a TWC catalyst to treat exhaust gases of internal combustion engines, the catalyst is subjected to high temperatures, for example, to temperatures of 700° C. or 800° C. or more. Unstabilized rare earth metal oxides such as ceria tend to thermally degrade at temperatures of about 600° C. to 700° C., sustaining a sharp reduction in surface area and collapse of the oxide surface so as to occlude the catalytic metals dispersed thereon. Accordingly, it is desirable that the ceria or other rare earth metal oxide should be stabilized against thermal degradation. As indicated above, aluminum-stabilized ceria is known as disclosed in the aforesaid U.S. Pat. Nos. 4,714,694 and 4,708,946. However, the resultant alumina (or other aluminum compound) stabilizer for the bulk rare earth metal oxide tends to coat the support particles and interferes with the fine dispersion of the rhodium catalyst metal on the support.

If, instead of an alumina stabilizer, a zirconia or lanthana stabilizing-promoter is used to stabilize the ceria or other rare earth metal oxide, the zirconia or lanthana stabilizing-promoter, unlike the aluminum-based stabilizer, does not interfere with the fine dispersion of rhodium crystallites on the support. The following comments concerning zirconia are believed to likewise apply to lanthana. Without wishing to be bound by any particular theory, it is believed that the zirconia stabilizing promoter forms "islands" of zirconia (or some other zirconium compound) on the rare earth metal oxide particles, leaving ample zirconia-free areas in which the fine platinum crystallites adhere directly to the rare earth metal oxide particles. This is in contrast to an aluminum-stabilized bulk ceria, because the resultant stabilizing alumina (or other aluminum compound) tends to coat the entire surface of the ceria particles, thereby losing the advantageous dispersion of small rhodium crystallites which is attainable when the rhodium is dispersed directly onto those portions of the surface which are substantially free of stabilizer. A lanthanum stabilizer provides the same type of advantage as does the zirconium stabilizer.

Although the rare earth metal oxide, e.g., ceria, provides an excellent support with regard to a high degree of dispersion of small rhodium crystallites thereon, the catalytic activity of such catalysts not containing an effective amount of palladium and in which rhodium is dispersed directly onto the ceria or other rare earth oxide-containing support, was found to rather quickly deteriorate after the catalysts had been placed in use. Again, without wishing to be bound by any particular theory, and as described in the above-mentioned copending and commonly-assigned U.S. patent application Ser. No. 07/341,606 of Dettling et al, (now abandoned) it is believed that the rhodium metal interacts with the ceria (or other rare earth metal oxide) to form a Rh-CeOx complex, in which the rhodium forms a pseudo-oxide which is difficult to reduce. Accordingly, the rhodium is trapped in a, for example, Rh-CeOx complex and its catalytic efficacy is thereby reduced or eliminated. It was found that the inclusion of a more readily reducible catalytic component in combination with the rhodium facilitated reduction of the pseudo-rhodium oxide to rhodium metal, thereby restoring the rhodium to elemental form and maintaining its catalytic efficacy. Palladium provides such a more readily reducible oxide or pseudo-oxide: it is believed that the reduction of the palladium oxide or palladium pseudo-oxide of a Pd-CeOx (or other rare earth oxide) complex facilitates the reduction of the rhodium pseudo-oxide to elemental rhodium.

Thus, by utilizing a zirconia stabilizing promoter and/or a lanthana stabilizing promoter for the bulk rare earth metal oxide, e.g., ceria, to enhance its thermal stability, or by using a co-formed rare earth oxide-zirconia support as described below, the dispersion of fine rhodium crystallites on the stabilized rare earth metal oxide support is attained, and by including palladium along with rhodium as the catalytic components, good durability, that is, a long duration of catalyst life, is attained. One embodiment of the catalyst of the present invention thus provides a catalytic material comprising a bulk support containing ceria or other rare earth metal oxide which has been treated with a suitable stabilizer. The stabilizer may be a zirconia stabilizing-promoter and/or a lanthana stabilizing-promoter or ceria which has been co-formed with zirconia or lanthana. Such embodiment of the catalyst also includes a rhodium and a palladium catalytic component dispersed on the bulk support.

Any suitable carrier may be employed, such as a monolithic carrier of the type having a plurality of fine, parallel gas flow passages extending therethrough from an inlet to an outlet face of the carrier, so that the passages are open to fluid flow therethrough The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to 600 or more gas inlet openings ("cells") per square inch of cross section. The carrier may be made of any suitable refractory material, for example, cordierite, cordierite-alpha alumina, silicon nitride, zircon mullite, spodumene, alumina-silica magnesia, zirconium silicate, sillimanite, magnesium silicates, zircon, petalite, alpha alumina and aluminosilicates.

The following detailed description relates to a preferred embodiment in which the various components of the catalyst material according to the present invention are divided into two distinct coats. It will be understood, however, that the present invention includes embodiments in which the claimed components are incorporated into a single washcoat.

THE FIRST OR BOTTOM COAT

The first (bottom) coat of the catalyst material according to the preferred dual-coat embodiment of this invention comprises a first catalyst component comprising a first platinum catalyst dispersed on a refractory inorganic oxide first support. The first coat may be deposited directly upon a suitable carrier such as a cordierite monolithic support. Preferably, ceria comprises at least about 0.5 percent by weight of this first support (calculated as $CeO_2$). The ceria is believed to form a stabilizing complex with platinum under the operating conditions encountered by automotive exhaust treatment catalysts. The addition of other stabilizing components has been found to further stabilize the interaction of platinum and ceria. Accordingly, a preferred refractory inorganic oxide first support for the first coat comprises alumina containing a stabilizing amount of one or more of ceria, zirconia, and calcium oxide ("calcia") which have been incorporated into the ceria by impregnation of the ceria with solutions, suspensions or other liquid-dispersions of precursors of ceria, zirconia and calcia. For example, the first support may be impregnated with solutions of soluble salts or precursor compounds, such as nitrates or acetates of cerium, zirconium and calcium followed by calcination of the impregnated support to reduce the nitrates to the corresponding oxides. Specifically, the alumina providing the first support is impregnated with the zirconia, ceria, and calcium oxide by preparing an aqueous slurry of fine particles of the alumina and adding acidic inorganic salt solutions containing aforesaid metals. Preferred salts include zirconyl sulfate, cerium nitrate and calcium nitrate. The solutions are allowed to impregnate the alumina, which is subsequently dried and calcined to convert the salts into oxides Alternatively, co-precipitation techniques may be employed to coprecipitate alumina, ceria, zirconia and calcia. Alumina may constitute from about 50 to 99 percent by weight of the first support, ceria may constitute from about 0.01 to 25 percent by weight of the first support, zirconia may constitute from about 0.09 to 25 percent by weight of the first support, and calcium oxide may constitute from about 0.001 to 0.10 percent by weight of the first support.

The alumina starting material is preferably a high surface area alumina, i.e., "activated" alumina such as a predominantly gamma alumina and should have a BET surface area of from about 60 to 300 m$^2$/g. Such activated alumina usually also includes other phases of alumina such as the delta, eta, kappa and theta phases. In addition to favorable interaction with the first platinum catalyst in the first coat, the aforesaid ceria, zirconia, and calcium oxide also serve to stabilize the alumina against thermal degradation with the accompanying surface area shrinkage, preventing the occlusion of the catalytic metal on the surface of the support. This phenomenon is known in the art; see for example, Keith et al, U.S. Pat. No. 4,171,288.

In one embodiment of the invention, the first support material may comprise alumina particles on which a co-formed rare earth metal oxide-zirconia material, such as a co-formed ceria-zirconia material, has been deposited and which has been stabilized with calcium oxide (calcia) by any suitable technique such as by impregnating the particles with a solution or other liquid dispersion of a calcium compound and calcining the impregnated material to impregnate the support material with calcium oxide. The provision of a core particle of alumina coated with the co-formed rare earth metal oxide-zirconia material and impregnated with calcia represents an economic savings over, for example, the use of co-formed ceria-zirconia materials as the support particles. Further, the alumina/rare earth metal oxide-zirconia/calcia support material has been found to provide a stable support material well-adapted as a support material for the platinum in catalysts used in high temperature operations which are subject to lean operating conditions, such as by the intermittent shut-off of fuel to the engine.

The platinum catalyst metal is dispersed on the first support in a conventional manner, preferably by preparing an aqueous solution of a decomposable platinum compound, impregnating the first support with the solution, and drying and calcining the wetted support in air to give a fine dispersion of platinum on the first support. Thus, after the platinum metal salt is impregnated into the first support, the support is dried and calcined, preferably at about 120° C. to 600° C. for about 0.1 to 24 hours to decompose the platinum salt and fix the platinum on the support. A preferred decomposable platinum compound is chloroplatinic acid but other decomposable platinum compounds such as ammonium chloroplatinate, hydroxy disulfite platinum (II) acid, bromoplatinic acid, platinum trichloride, platinum tetrachloride hydrate, platinum dichlorocarbonyl dichloride, dinitrodiamino platinum, and sodium tetranitroplatinate may also be used.

The first catalyst component thus formed is comminuted in a ball mill to obtain a powder having a particle size range of from about 5 to 20 microns, i.e., 90% by weight of the particles having a diameter of not more than about 20 microns. The first catalyst component powder may be mixed with water to obtain a slurry of from about 25 to 60 percent solids.

Optionally, bulk nickel oxide in an amount of from about 1 to 25 percent by weight of the first coat (dry basis) and bulk ceria in the amount of from about 1 to 25 percent by weight of the first coat (dry basis) may be added to the slurry, which is then ball milled to obtain the desired particle size distribution. Optionally, a baria stabilizer may be incorporated into the first coat in an amount of from about 0.01 to 2.5 percent by weight (as BaO) of the first coat. This may be accomplished by adding a solution of barium nitrate to the slurry of platinum-containing alumina. Separate slurries of bulk nickel oxide and bulk ceria, if desired, may be ball milled to attain the desired particle size, e.g., approximately 90% by weight of the particles being less than 10 microns in diameter, and the three slurries may then be mixed and adjusted to the desired solids content. Nickel oxide and ceria may each be added in quantities of from 0 to about 50% by weight of the first support, measured as NiO and CeO$_2$.

THE SECOND OR TOP COAT

The second (top) coat may comprise a second catalyst component and a third catalyst component, and overlies the bottom coat. The second catalyst component comprises a second platinum catalyst dispersed on a stabilized alumina second support. Preferably, the alumina in the second support is stabilized by incorporating zirconia into the second support to provide zirconia (measured as ZrO$_2$) in the amount of from about 5 to 25 percent by weight of the second support, but other stabilizers may be used such as baria, as is known in the art. The second platinum catalyst is dispersed on the second support to give a platinum content of from about 0.1 to 1.0 percent platinum metal by weight of the second catalyst component, by wetting the alumina second support with a solution of a decomposable platinum compound and precipitating the platinum onto the second support. The alumina second support is comminuted until about 90% by weight of the particles are smaller than 10 microns in diameter.

The third catalyst component comprises a rhodium-palladium catalyst comprising rhodium and palladium metals dispersed on a rare earth oxide-containing support material which serves as a third support. It has been found that the addition of a small amount of palladium significantly improves the performance of the rhodium catalyst. One embodiment of the invention provides a third catalyst component comprising a ceria-stabilized zirconia powder having a particle size distribution in which 90% by weight of the particles are smaller than 10 microns diameter, and having a BET surface area of from about 20 to 200 m²/g, and having incorporated therein ceria in the amount of from about 5 to 50% by weight of zirconia plus ceria.

To prepare the third catalyst component, the ceria-stabilized third support is wetted with a solution containing decomposable salts of rhodium and palladium and is then dried, calcined and comminuted to the desired particle size for the preparation of a washcoat slurry. Decomposable, soluble compounds of rhodium and palladium which may be used include rhodium trichloride, hexamine rhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diaminepalladium hydroxide and tetraaminepalladium chloride, with rhodium chloride and chloropalladic acid being preferred. Sufficient amounts of the decomposable compounds of palladium and rhodium are dissolved in the solution so that rhodium metal constitutes from about 0.1 to 1.0 percent by weight of the second catalyst component, and palladium metal constitutes from about 0.05 to 0.5 percent by weight of the third catalyst component.

The second washcoat is prepared by mixing the second and third catalyst components together in a slurry.

A carrier such as those described above, i.e, a cordierite monolith, is first dipped into the first washcoat with a target coating of from about 1.5 to 2.0 grams per cubic inch ("g/in³") of carrier. The carrier is then dried in air at from about 100° C. to 120° C. until dry, and is then calcined in air at from about 400° C. to 600° C. for a period of from 0.25 to 2 hours. The carrier is then dipped into the second washcoat with a target coating weight (including bottom coat) of from about 2.5 to 3.0 g/in³ of the carrier, is then dried in air at from about 100° C. to 120° C. and calcined in air at from about 400° C. to 600° C. for about 0.25 to 2 hours.

It is known in the art that under lean (i.e., oxygen-rich) conditions, rhodium interacts with rare earth oxides to form catalytically inactive rhodates. Thus, rhodium dispersed on a support comprising ceria will ordinarily become deactivated at temperatures above 850° C. when the air-to-fuel mixture to the engine whose exhaust gas is being treated by the catalyst becomes lean. It is believed that this deactivation of the catalyst as a result of the formation of inactive rhodates may be reversed by reversing the rhodate formation. Ordinarily, such a reversal is believed to require extremely fuel-rich operating conditions which are rarely achieved in typical applications. It has been found that the dispersal of a second metal on the ceria-containing support enhances the ability of the catalyst to regain performance after exposure to the otherwise deactivating high temperature, lean exhaust gas conditions described above. The formation of rhodates is believed to involve the reaction of some of the oxygen from the lean air-fuel mixture. If reversal of the rhodate formation occurs, it may be expected to release some of the absorbed oxygen. Therefore, one test of the ability of a rhodium catalyst to survive lean operating conditions is to take the deactivated rhodate-containing catalyst and determine whether the rhodate can be reduced to reconstitute activity of the catalyst.

EXAMPLE 1

To demonstrate the unexpected advantageous effect of combining a small amount of palladium with rhodium on a co-formed zirconia-ceria support, quantities of a co-formed zirconia-ceria support material consisting of 88% zirconia and 12% ceria by weight and having a BET surface area of 52 m²/g were impregnated with rhodium and other metals and subjected to a temperature programmed reduction ("TPR") study to measure the reducible characteristics of the catalyst samples. Reducibility on an oxide like ceria with a catalytic precious metal such as rhodium or palladium, etc. is an indication of the activation of the oxide surface by the metal to release oxygen. The temperature of reduction indicated that the catalyst will be able to handle rich excursions more easily, taking the surface oxygen from the support. The samples were prepared by impregnating the support with solutions of nitrates of rhodium, palladium and nickel and calcining the thus-impregnated supports in air. Under the TPR study, a test gas containing hydrogen is passed over a test deactivated sample and the loss of hydrogen (attributed to the reaction of the hydrogen with oxygen released from the reactivated sample) provides a measure of the sample's ability to be reactivated. Sample 1A consists of the co-formed support without any dispersed catalytic metal thereon. Samples 1B, 1C and 1D each include 0.77% by weight of rhodium metal dispersed thereon. Sample 1C also includes 2.0% by weight nickel and Sample 1D includes 0.12% by weight palladium. All percents by weight are percent by weight of the sample weight. The temperature associated with the reduction of the precious metal oxide to the metal was measured, and the results are tabulated below in TABLE I.

TABLE I

| Sample Type (ZrO—CeO) | Temperature Programmed Reduction | | | | $CeO_2$ Red'n** Temp. °C. |
|---|---|---|---|---|---|
| | % Rh | % Pd | % Ni | Metal Induced Red'n* Temp. °C. | |
| 1A | — | — | — | — | 550 |
| 1B | 0.77 | — | — | 135 | 460 |
| 1C | 0.77 | — | 2.0 | 140 | 450 |
| 1D | 0.77 | 0.12 | — | 95 | 450 |

*Metal Induced Red'n = reduction of $CeO_2$ oxide surface by the metal.
**$CeO_2$ Red'n = reduction of ceria from $Ce^{+4}$ to $Ce^{+3}$.

The data clearly show that the presence of rhodium, even alone, significantly reduces the temperature at which reduction occurs. The presence of nickel in combination with Rh has a neglible effect, but the addition of the smaller amount of palladium clearly results in a significant lowering of the first reduction peak temperature. The temperatures given in TABLE I are the temperatures at which sudden drops in the hydrogen content of the test gas were observed to occur for each sample, indicating a release of oxygen and an activation of the ceria surface. The addition of catalytic metals clearly provides a peak at a far lower temperature (450° to 460° C.) than occurs when no catalytic metal is present (550° C.). Therefore, it can be seen that the addition of Rh in Sample 1B lowers the reduction of the $CeO_2$ peak by 90° C. as compared to Sample 1A. The addition of Ni or Pd to a sample containing rhodium (Samples 1C and 1D) does not significantly change the temperature at which the $CeO_2$ reduces. Nickel addition has no effect on the reduction of the Rh, while the presence of Pd lowers the reduction peak by 40° C. This would indicate that Pd is a good candidate for activating the Rh supported on a ceria support after is has been exposed to high temperature lean aging conditions.

EXAMPLE 2

Reference Catalyst

The first or bottom coat of a two-layered reference catalyst is prepared by placing 75 grams of activated alumina into a half gallon ball mill with appropriate grinding media. The alumina has a BET surface area of 130 to 150 $m^2/g$. Eighty grams of deionized water is added, and the slurry is mixed for 5 minutes. Then, 1.54 grams of platinum from a monoethanolamine solution of platinum hydroxide is added to the ball mill After mixing for an additional 20 minutes, 1.5 grams of glacial acetic acid is added and mixing is continued for another 10 minutes. Then, 90 grams of bulk ceria having a BET surface area of 160 $m^2/g$ and 68.2 grams of a zirconyl acetate solution containing enough zirconium to provide 22% zirconia by weight, 20.5 grams of barium hydroxide and 10 grams of glacial acetic acid are further added to the ball mill which is then run to obtain a particle size such that 90 percent of the resulting frit has particles smaller than 10 microns in diameter. The solids content is adjusted to 53.8%. Twenty grams of a slurry containing 50% nickel oxide by weight as particles 90 percent of which are smaller than 10 microns and 9.7 grams magnetite powder ($Fe_3O_4$) are added, and mixing continues for 10 minutes.

A cordierite monolith supplied by Corning and having 400 cells per square inch (400 gas flow passages per square inch of end-face area) is submerged in the slurry for 1 minute and withdrawn to obtain a coating of the washcoat thereon. The coated monolith is drained of excess slurry and blown with compressed air to remove excess slurry, and then is dried for at least 5 hours at 100° C. and calcined at 450° C. for 1 hour in air to provide thereon 2.10 $g/in^3$ of dried, calcined washcoat.

The second or top coat of the reference catalyst is prepared by placing 1.359 kilograms of alumina having a BET surface area between 130 and 150 $m^2/g$ in a planetary mixer and impregnating the alumina by the incipient wetness method with a monoethanolamine platinum hydroxide solution to give a loading of 0.55% platinum by weight of the platinum plus the alumina. The powder is treated with acetic acid to achieve a pH of 7 upon the addition of 110 grams of deionized water containing 1.2 grams of concentrated nitric acid. The treated powder, water and nitric acid are placed in a ball mill which is then run until 90% of the particles are smaller than 10 microns in diameter.

In a separate planetary mixer, a co-formed zirconia-ceria support material having 88% zirconia and a surface area of 52 $m^2/g$ is mixed with a rhodium nitrate solution to give a rhodium loading of 0.64% by weight of the rhodium plus the support. After thorough mixing, the zirconia support is dried overnight and calcined at 500° C. for 2 hours.

A rhodium solution containing 16.5 grams of rhodium nitrate and 143.5 grams of deionized water is added to a vessel containing 110 grams of the platinum component. To this mixture, 12.7 grams of glacial acetic acid is added and the powder is mixed for 5 minutes. Sixty grams of the rhodium component is added to this mixture and mixing continues for 20 minutes. Then, 68.2 grams of zirconyl acetate solution containing enough zirconium to provide 22% by weight zirconia (percent by weight of the total weight of zirconyl acetate) is added, and additional deionized water is added to achieve a slurry with a solids content of 32%. The previously coated monolith is submerged into this second slurry to obtain thereon an additional slurry coating and the monolith is again blown with compressed air to remove excess slurry, dried at 100° C. for 5 hours and calcined at 450° C. for 1 hour in air to provide thereon 0.90 $g/in^3$ of a second (top), calcined washcoat The final total washcoat precious metal loading is a nominal 40 $g/ft^3$ of precious metal (platinum plus rhodium) and has a platinum to rhodium weight ratio of 5:1. This reference catalyst is designated catalyst R-2.

EXAMPLE 3

Experimental Catalysts

Three experimental catalysts designated E2-A, E2-B and E2-C are prepared in the same manner as reference catalyst R-2 of Example 2, except that in the preparation of the first coat, in all three cases the magnetite was omitted and the equivalent platinum or palladium was added directly to the co-formed ceria-zirconia support with the rhodium component. The total platinum content in the second coat was the same in the experimental samples as in the reference catalyst. Further, in the case of experimental catalyst E2-D, in addition to the rhodium contained in the second coat and dispersed on the co-formed ceria-zirconia support, palladium (not platinum) was impregnated into the co-formed zirconia-ceria support.

A. Preparation of First Washcoat

A first catalytic component for a series of experimental samples was prepared by impregnating a first alumina support having a surface area of about 150 $m^2/g$ with an acidic solution of cerium nitrate, zirconyl oxysulfate and calcium nitrate, to give a 10% by weight loading of the oxides (calculated as the oxides) of the total weight of oxides plus the alumina, in a weight ratio (as the oxides) of 10 $CeO_2$:88 $ZrO_2$:2 CaO. The alumina is impregnated to incipient wetness with the acidic solution and is thoroughly mixed for 20 minutes, at which time a concentrated ammonium hydroxide solution is added to adjust the pH to between 7.0 and 7.5. The material is mixed for an additional 20 minutes and the resulting semi-wet powder is then dried at 110° C. for 2 hours and calcined at 750° C. for 2 hours in air. This material is referred to below as Powder A.

The first catalytic component is prepared by placing 1.35 kilograms of the zirconia-ceria-calcium oxide-impregnated alumina powder (Powder A) in a one-gallon ball mill with 1.35 kilograms of deionized water and mixing for 5 minutes, after which 15.43 grams of platinum from a monoethanolamine platinum hydroxide solution is added and mixed for an additional 20 minutes. A solution of 34.08 grams of barium nitrate crystals in deionized water is then added and the resulting slurry is mixed for 20 minutes, at which time 2 grams of glacial acetic acid is added. Milling is continued until about 90% by weight of the particles are smaller than 10 microns in diameter. At that time, 400 grams of an aqueous nickel oxide slurry having a 50% solids content and the same particle size distribution as the impregnated alumina is blended into the slurry with 200 grams of bulk ceria having a surface area of 30 $m^2/g$ and the resulting mixture is homogenized for 10 minutes. Mixing is continued for 10 minutes and the solids content is adjusted to 44%.

B. Preparation of Second Washcoat

A slurry for use as a washcoat of the finished catalyst is prepared by adding 660 grams of alumina having a surface area of about 150 $m^2/g$ and 660 grams of deionized water and mixing for 5 minutes in a separate one-gallon ball mill. To this mixture, 4.65 grams of platinum from a monoethanolamine platinum hydroxide solution is added and mixed for 20 minutes. Then, 10.22 grams of barium nitrate crystals is added and mixed for 20 minutes, at which time 13 grams of glacial acetic acid is also added. Milling continues until 90% by weight of the particles are smaller than 10 microns in diameter.

A co-formed zirconia-ceria powder comprising 12% by weight $CeO_2$ and 88% by weight $ZrO_2$ and having a BET surface area of 52 $m^2/g$ is impregnated with rhodium nitrate solution. This is accomplished by placing 700 grams of the co-formed ceria-zirconia powder in a mixer and adding 5.4 grams of rhodium from a $Rh(NO_3)_2$ solution and 0.812 grams of palladium from a $Pd(NO_3)_2$ solution. The two solutions give a total solution of 140 grams with a pH of less than 1.0 and wet the powder to incipient wetness, by slowly adding the rhodium-palladium solution to the co-formed ceria-zirconia powder over a one-half hour period and is then mixed for an additional one-half hour. The wet powder is dried at 120° C. and the dried powder is calcined in air at 500° C. by heating in silica boats which are raised to temperature at at rate of 100° C. per hour and held at that temperature for 1 hour. Two other second catalytic components are prepared similarly, but with different loadings of palladium. The three experimental second components are designated components A, B and C.

Experimental Samples E3-A, E3-B and E3-C are prepared by coating a commercially available cordierite honeycomb having 400 cells per square inch in the first washcoat slurry to obtain a loading of 1.79 $g/in^3$ on a dry basis. The excess slurry is blown off and the monolith samples are dried at 110° C. overnight and then calcined at 500° C. for 1 hour. Second washcoat slurries A, B and C are prepared by adding 600 grams of each of the rhodium-palladium second components A, B and C, respectively, to 660 grams of the platinum-containing third catalytic component previously prepared, and mixing for 5 minutes, and then adding 16 grams of glacial acetic acid. Milling is continued for 5 minutes at which time 273 grams of zirconyl acetate solution is added and mixing continues for 5 minutes. The monoliths already coated with the first washcoat are dipped into second washcoat slurries A, B or C which are adjusted to 33% solids content to obtain an additional 1.11 $g/in^3$ of coating on a dried, calcined basis. The monoliths are then dried at 100° C., calcined at 500° C. as before and designated Samples E3-A, E3-B and E3-C.

Reference Sample R-2 and experimental Samples E2-A, E2-B and E2-C and E2-D of Example 2 and E3-A, E3-B and E3-C of Example 3 were aged for 50 hours on an engine dynamometer cycle at 900° C. The engines were run for 60 seconds at stoichiometric air-to-fuel ratio conditions and after the 60 seconds of stoichiometric operation air is injected into the feed stream for 6 seconds to give 10% (by volume) oxygen over the respective test samples. The evaluation is conducted at 500° C., 80,000 VHSV, ±1.0 A/F at 1.0 Hz. The effectiveness of the various samples is indicated as a measure of the conversion efficiency for the various gaseous contaminants in the exhaust fumes, hydrocarbons, carbon monoxide and NOx. The results are set forth in TABLE II.

TABLE II

| Effect of Pd Promotion on Stoichiometric Performance* | | | | | |
|---|---|---|---|---|---|
| ZrO—CeO + Rh Component | | | | | |
| Identification | Rh/Pd | Rh/Pt | HC | CO | NOx |
| R-2 | — | Rh Only — | 87 | 53 | 54 |
| E2-A | — | 2.0 | 78 | 34 | 58 |
| E2-B | — | 1.0 | 78 | 39 | 56 |
| E2-C | — | 0.5 | 78 | 39 | 58 |
| E3-A | 3.3 | — | 83 | 54 | 65 |
| E2-D | 6.7 | — | 85 | 50 | 63 |
| E3-B | 6.7 | — | 84 | 51 | 65 |
| E3-C | 13.1 | — | 82 | 45 | 63 |

*Catalyst aged for 50 hours on engine dynamometer cycle at 900° C. For 60 seconds engine runs at stoichiometric condition and for 6 seconds air is injected into feedstream to give 10% $O_2$ over catalyst. Evaluation conducted at 500° C., 80,000 VHSV, ± 1.0 A/F @ 1.0 Hz.

It is clear from TABLE II that the addition of a small amount of platinum to the rhodium catalytic component has a small beneficial effect in maintaining the NOx reduction activity of the catalyst in lean conditions after aging. However, the experimental catalysts containing small amounts of palladium dispersed with rhodium on the co-formed support material shows significant improvement in NOx reduction after aging, without significant detriment to carbon monoxide and hydrocarbon conversion.

EXAMPLE 4

It is found that the impregnation of calcia, ceria and zirconia into the first alumina support (contained in the first coat or layer) improves the capacity of the alumina material to release stored oxygen during fuel-rich operation. To confirm this advantage, it is preferred to prepare compositions comprising only the species which are impregnated into the alumina (e.g., calcium, cerium, etc.) and to exclude the alumina itself due to the large dilution effect obtained when the ceria, zirconia and calcium oxide are impregnated into the alumina. Samples comprising zirconia and ceria were prepared by precipitation, with and without calcium oxide. The precipitated materials were filtered, dried and calcined in air at 750° C. for 2 hours. Temperature Programmed Reduction (as previously described) analysis was performed on the samples with the results shown in TABLE III.

TABLE III

| TPR Analysis of CaO Modified $CeO_2$—$ZrO_2$ Composites | | | | | |
|---|---|---|---|---|---|
| | | | Peak Reduction Temperature °C. | | BET Surface |
| % $CeO_2$ | % $ZrO_2$ | % CaO | #1 | #2 | Area $m^2/g$ |
| 10 | 88 | 2 | 350 | 575 | 29 |
| 10 | 90 | — | — | 575 | 11 |

TABLE III-continued

TPR Analysis of CaO Modified CeO2—ZrO2 Composites

| % CeO2 | % ZrO2 | % CaO | Peak Reduction Temperature °C. #1 | #2 | BET Surface Area m²/g |
|---|---|---|---|---|---|
| 20 | 80 | — | — | 575 | 29* |

*Reference commercially available material.

The data of TABLE III show that the addition of calcium oxide yields a low temperature reduction peak not observed with zirconia and ceria alone. This indicates that the presence of calcium oxide encourages the release of stored oxygen at lower temperatures and thus indicates the improvement of post-aging catalytic performance.

EXAMPLE 5

Two samples of catalyst E3-B were compared to a commercially available two-layer automotive catalyst in a 100 hour aging test at 850° C. and 900° C. After aging, the test engine was run for 60 seconds at stoichiometric conditions followed by a fuel shut-off for 6 seconds during which the inlet gas experienced 21% oxygen. The commercially available double-layer reference catalyst is designated R-5 and comprises an undercoat of ceria-impregnated alumina on which platinum is dispersed, and coated on the monolith at 1.80 g/in³. The second or top coat of the reference catalyst comprises an alumina component and a CeO2-ZrO2 co-gel matrix on which rhodium is dispersed and is coated at 0.61 g/in³. Experimental catalyst E3-B contained 41 g/ft³ of precious metals in a ratio of 5.01 Pt:0.15 Pd:1 Rh while the commercial catalyst had a nominal 40 g/ft³ of precious metal at a ratio of 5.0 Pt:1 Rh. The conversion performance of the reference and experimental sample at the two temperatures after the test cycle is given in TABLE IV.

TABLE IV

Aging Temperature Effect on FTP (?) Performance

| Sample | Inlet Aging Temp. °C. | FTP Total % Conversion HC | CO | NOx |
|---|---|---|---|---|
| R-5 | 850 | 79 | 77 | 71 |
| E3-B | 850 | 79 | 76 | 76 |
| R-5 | 900 | 73 | 67 | 60 |
| E3-B | 900 | 81 | 78 | 77 |

The data clearly show that at 850° C. the experimental sample provides superior NOx conversion after aging and at 900° C. provides superior overall performance.

EXAMPLE 6

Catalyst material prepared according to Sample E3-B was deposited on a 4.16 inch diameter, 4.3 inch long NGK, 300 cell per inch monolithic substrate to provide 48 g/ft³ of precious metals at a ratio of 5.01 Pt:0.15 Pd:1 Rh. A commercial reference catalyst containing 47 g/ft³ at 5 Pt:1 Rh was used for comparison and was designated R-6. This was a single layer catalyst carried on a monolith at 2.33 grams of catalyst material per cubic inch and the precious metal was dispersed on a support comprising CeO2, Al2O3, BaO, NiO and ZrO2. The two samples were aged at 900° C. for 45, 90 and 135 hours in the manner described with respect to Example 5 (?). The oxygen spike at the end of the 45 and 90 hour cycles was limited to 3% whereas the oxygen spike at the end of the 135 hour aging cycle was 21%. The resulting performance of reference R-6 and experimental Sample E3-B are shown in TABLE V.

TABLE V

O2 Concentration Effect on FTP Performance

| Sample | Aging Time (Hrs) | % Inlet O2 Level | FTP Total % Conversion HC | CO | NOx |
|---|---|---|---|---|---|
| R-6 | 45 | 3 | 87 | 77 | 92 |
| E3-B | 45 | 3 | 87 | 78 | 90 |
| R-6 | 90 | 3 | 87 | 79 | 91 |
| E3-B | 90 | 3 | 88 | 81 | 90 |
| R-6 | 135 | 21 | 81 | 66 | 81 |
| E3-B | 135 | 21 | 89 | 77 | 86 |

The data in TABLE V clearly show that the experimental Sample E3-B performs as well as the reference sample in the absence of a significant oxygen inlet content. However, after exposure to the 21 percent oxygen spike, Sample E3-B exhibits clearly superior overall performance, demonstrating that the incorporation of palladium mitigates the deactivating effect of lean operating conditions by allowing for the re-activation of rhodium under mild reducing conditions.

While the invention has been described in detail with respect to specific embodiments thereof, it will be appreciated that numerous variations to those embodiments will lie within the scope of the appended claims.

What is claimed is:

1. A catalyst composition comprising a carrier on which is disposed a catalytic material comprising: (a) a first support comprising stabilized alumina, (b) a catalytically effective amount of a first platinum catalytic component dispersed on the first support, (c) a second support consisting essentially of a are earth metal oxide, (d) a catalytically effective amount of both a rhodium catalytic component and a palladium catalytic component dispersed on the second support, the rhodium and palladium catalytic components being present in quantities to provide in the catalytic material a rhodium to palladium weight ratio of from about 50:1 to 1:50, measured as metals.

2. The catalyst composition of claim 1 wherein the second support consists essentially of ceria.

3. The catalyst composition of claim 1 wherein the second support consists essentially of a first co-formed rare earth metal oxide-zirconia support.

4. The catalyst composition of claim 1 wherein the second support consists essentially of a co-formed ceria-zirconia support.

5. The catalyst composition of claim 4 wherein the co-formed ceria-zirconia support consists essentially of from about 5 to 30 weight percent ceria, and from about 95 to 70 weight percent zirconia.

6. The catalyst composition of claim 1 wherein the first support further comprises bulk nickel oxide and bulk ceria.

7. The catalyst composition of claim 6 wherein the bulk ceria has a BET surface area of not greater than about 100 m²/g.

8. The catalyst composition of claim 1 further comprising (e) a third support comprising stabilized alumina, and (f) a catalytically effective amount of a second platinum catalytic component dispersed on the third support.

9. The catalyst composition of claim 8 wherein the third support is stabilized with one or both of zirconia and baria.

10. The catalyst composition of claim 8 wherein the second support is stabilized with zirconia.

11. The catalyst composition of claim 8 or claim 10 wherein components (a) and (b) of the catalytic material are contained in a bottom coat disposed on the carrier and components (c), (d), (e) and (f) of the catalytic material are contained in a top coat overlying the bottom coat.

12. The catalyst composition of claim 11 wherein the second support consists essentially of a first co-formed ceria-zirconia support.

13. The catalyst composition of claim 12 wherein the first support further comprises a second co-formed rare earth metal oxide-zirconia material.

14. The catalyst composition of claim 13 wherein the second co-formed rare earth metal oxide-zirconia material is stabilized with calcium oxide.

15. The catalyst composition of claim 13 wherein the second co-formed rare earth metal oxide-zirconia material comprises co-formed ceria-zirconia.

16. The catalyst composition of claim 15 wherein the second co-formed support material is stabilized with calcium oxide.

17. A catalyst composition comprising a carrier on which is disposed a catalytic material comprising a catalytically effective amount of a first platinum catalytic component dispersed on a first support material comprising stabilized alumina and a catalytically effective amount of both a rhodium catalytic component and palladium catalytic component dispersed entirely on a substantially alumina-free second support material comprising a rare earth metal oxide, the rhodium and palladium catalytic components being present in quantities to provide in the catalytic material a rhodium to palladium weight ratio of from about 50:1 to 1:50, measured as the metals.

* * * * *